United States Patent [19]
Anna et al.

[11] Patent Number: 5,781,995
[45] Date of Patent: Jul. 21, 1998

[54] METHOD OF REPAIRING A DEFECTIVE PORTION IN A FLUID CARRYING TUBE

[75] Inventors: John P. Anna; Paul B. Cunningham, both of Uniontown, Pa.

[73] Assignee: Allegheny Power Service Corporation, Greensburg, Pa.

[21] Appl. No.: 780,990

[22] Filed: Jan. 9, 1997

[51] Int. Cl.$^6$ ................................................. B23P 15/26
[52] U.S. Cl. ........................ 29/890.031; 29/890.144; 29/402.08; 29/402.11; 29/402.17
[58] Field of Search ................ 29/810.14, 890.144, 29/890, 141, 402.08, 402.11, 402.17, 890.031; 138/97, 99, DIG. 8

[56] References Cited

U.S. PATENT DOCUMENTS

| | | | |
|---|---|---|---|
| 2,276,443 | 3/1942 | Wilson | 138/97 |
| 4,041,720 | 8/1977 | Lebourg | 138/97 |
| 4,047,659 | 9/1977 | Vucic | 138/47 |
| 4,186,475 | 2/1980 | Jonsson | 138/97 |
| 4,218,812 | 8/1980 | Jonsson | 138/97 |
| 4,357,960 | 11/1982 | Han | 138/97 |
| 4,413,765 | 11/1983 | Tracy | 138/97 |
| 4,437,494 | 3/1984 | Soper et al. | 138/97 |
| 4,807,340 | 2/1989 | Fuller et al. | 29/890.14 |
| 5,062,207 | 11/1991 | Martin et al. | 29/402.03 |
| 5,363,541 | 11/1994 | Toomey et al. | 29/840.14 |
| 5,542,713 | 8/1996 | Miyazaki et al. | 285/158 |
| 5,573,283 | 11/1996 | Sellers et al. | 29/840.144 |

*Primary Examiner*—Irene Cuda
*Attorney, Agent, or Firm*—Arnold B. Silverman; Eckert Seamans Cherin & Mellott, LLC

[57] ABSTRACT

A method of repairing a defective portion of a tube which is one of a plurality of generally parallel elongated tubes includes severing an axial portion of the tube which contains a defective portion, bending the free end portions of the tube disposed adjacent to where the axial portion which was severed, and securing an insert tube to the free end portions of the tube disposed adjacent to where the removed axial portion was located to thereby establish a passage for free flow of fluid within the repaired tube. In a preferred embodiment of the invention, the free end portions will be bent in substantially the same direction about 20 to 60 degrees with respect to the longitudinal axis of the tube when the tube being repaired is part of a water wall of a fossil fuel fired boiler and the repair is effected from the cold side thereof.

19 Claims, 4 Drawing Sheets

METHOD OF REPAIRING A DEFECTIVE PORTION IN A FLUID CARRYING TUBE

BACKGROUND OF THE INVENTION

1. Field of the Invention

The present invention relates to a method of repairing a defective portion of a tube and, more specifically, it relates to such a method wherein the tube is part of a wall of generally parallel tubes.

2. Description of the Prior Art

One of the problems encountered with the operation of various types of heat exchangers, wherein a fluid flows through an array of tubes, is the difficulty of accessing the portion or portions of the tube which need to be repaired in the event of a blockage or leak in the tube. Such difficulties are particularly acute with respect to coal fired boilers of fossil fuel steam generator plants and tube arrays, such as are provided in the windbox, vestibule and back pass. The economic consequences of an extended shutdown, as well as the safety hazards to workman are prime factors to be considered in dealing with such problems.

U.S. Pat. No. 3,962,767 discloses a method of repairing a tube in a heat exchanger which involves inserting a sleeve having an annular projection into the two severed ends of the tube and welding the sleeve inside the tube.

U.S. Pat. No. 3,807,024 is directed toward the repair of a damaged tube in an upright finned tube wall of a boiler or fire heater. The damaged portion is removed and the fins are cut. Guide rings are employed in cooperation with supporting fins to facilitate downhand welding.

U.S. Pat. No. 4,413,765 discloses in situ repair of a worn pipe section wherein the pipe is in a sloped position and is employed to deliver materials, such as grain feed with the result that the frictional forces ultimately wears through the pipe. This patent teaches effecting axial rotation of the pipe so that the worn portion is no longer the portion in contact with the grain moving through the pipe under the influence of gravity.

U.S. Pat. No. 4,605,155 discloses repairing a defective tube by cutting an opening of the tube on the side opposite to the defect and providing a tubular insert into the tube to cover the defect. The insert is secured by brazing or welding. Close-out patches are also welded or brazed to both the insert and the tube.

Despite these prior art teachings, there remains a very real and substantial need for an effective method for repairing defective tube portions, particularly where the tube is in an array of tubes or, otherwise, is in an area which limits full access to the tube portion which contains the defective region and, most importantly, to effect such a repair without exposing repair personnel to substantial safety hazards.

SUMMARY OF THE INVENTION

The present invention has met the above-described need. The method of repairing a defective portion in one of a plurality of generally parallel elongated tubes includes severing an axial portion of the tube which contains a defective portion, bending the free end portions of the tube disposed adjacent to where the axial portion was located prior to removal and securing an insert tube to the free end portions to reestablish a passage for free flow of fluid within the repaired tube. In one embodiment, the invention is used to repair tubes which are employed in a coal burning steam generating plant with repair being effected from the cool side of the tube wall.

It is preferred that the bent free ends have a lesser included angle of about 20 to 60 degrees with respect to the tube axis on tubes with a generally straight axis.

In one embodiment, sockets may be welded to the bent portions of the tube being repaired and to the insert tube. In another embodiment, butt welding may be employed. Also, for certain embodiments, compression fittings and threaded connections may be employed.

The method of the invention may be employed on straight tubes, as well as tubes having an axial bend.

It is an object of the present invention to provide a safe and efficient method for dependably effecting replacement of defective tube sections which are present in an array of generally parallel elongated tubes.

It is another object of the present invention to provide such a method which can be employed so as to minimize downtime of boilers and other equipment associated with heat exchanging tubes which have fluid flowing therethrough.

It is a further object of the present invention to provide such a method which may be employed with fossil fuel burning boilers such that the repairs may be made while remaining on the cool side of the tube walls.

It is a further object of the present invention to provide such a system which may be used with tubes which normally contain fluid at elevated temperature or pressure or both.

It is another object of the present invention to provide such a method which permits 360 degree welding in replacing a damaged portion of a tube without exposing the repair workman to undue risk.

It is a further object of the present invention to provide a sufficiently effective repair method so that the full replacement of the tube can await the next scheduled downtime of the system.

These and other objects of the invention will be more fully understood from the following description of the invention on reference to the drawings appended hereto.

DESCRIPTION OF THE PREFERRED EMBODIMENTS

As employed herein, the term "defective portion" as related to a tube, refers to any condition of the tube which precludes its operation with desired efficiency or presents a hazard to adjacent workman or facilities and equipment and shall expressly include tubes having undesired openings, tubes having inadequate tube wall thickness, tubes which are blocked so as to inhibit efficient flow therethrough, and inadequate tube wall thickness.

Figure 1:
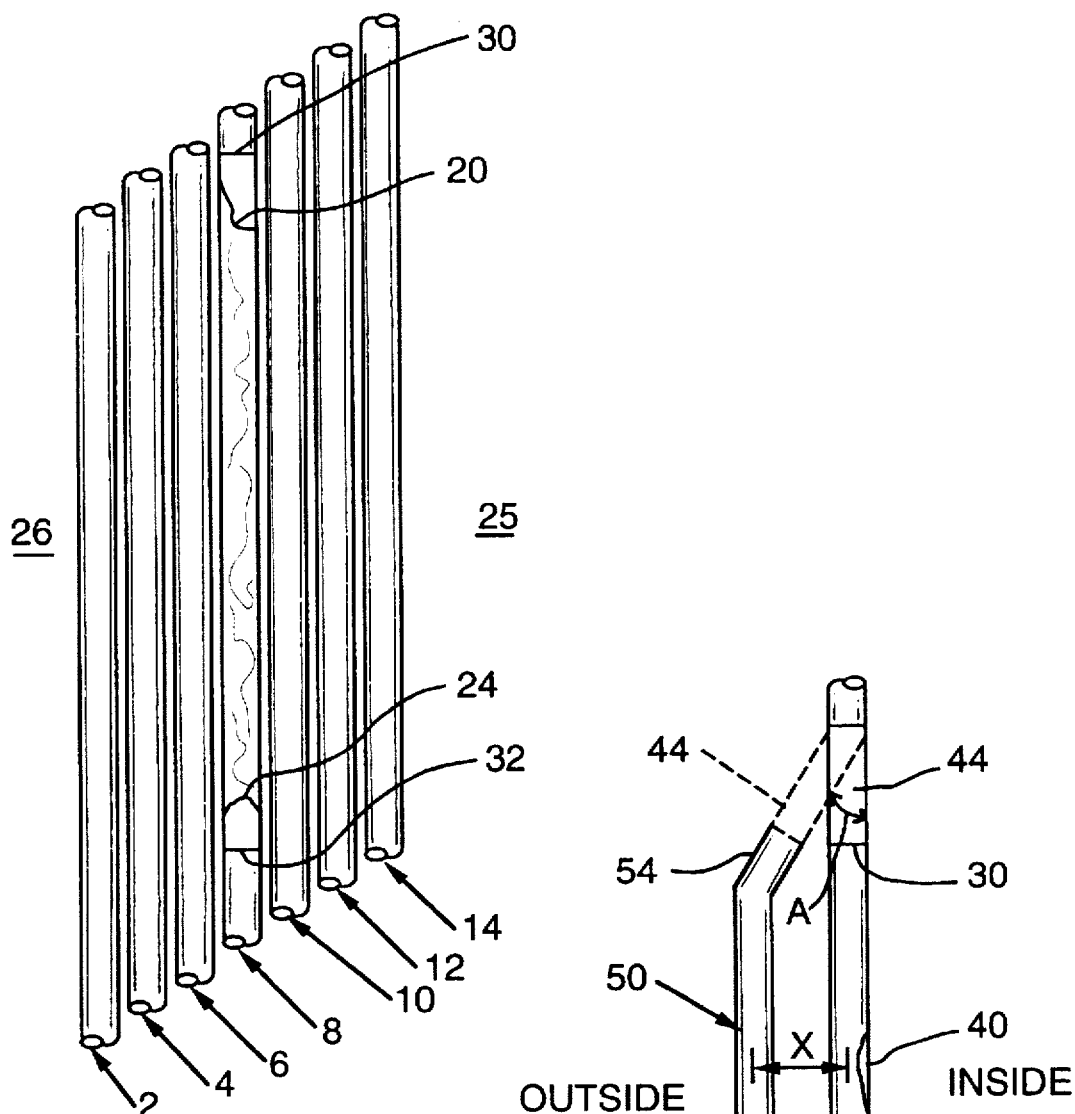
FIG. 1 is a partially schematic perspective view of an array of tubes with one of the tubes having a defective portion.

FIG. 1 shows a plurality of tubes 2, 4, 6, 8, 10, 12, 14 which have their longitudinal axes oriented generally parallel with respect to each other. The tubes are in sufficiently close proximity as to form a wall, such as a water wall, which may be employed in the furnace of a fossil fuel steam generating boiler. The tube wall separates an inside sector 25 which may be at an elevated temperature on the order of approximately 3500° F., for example, from an outside sector 26 which may be on the order of 600° F., for example. The fluid within the pipes may be in the range of about 40° F. to 800° F. and at a pressure as high as 3600 psi. Safety for the repair personnel is provided by allowing them to work in the relatively cool outside portion. It will be appreciated that as a result of the relative close proximity of the tubes to each other, the defective portion of tube 8, which may be considered as extending from reference number 20 axially to reference number 24, cannot be readily replaced as only limited access to the tube is permitted.

Figure 2:
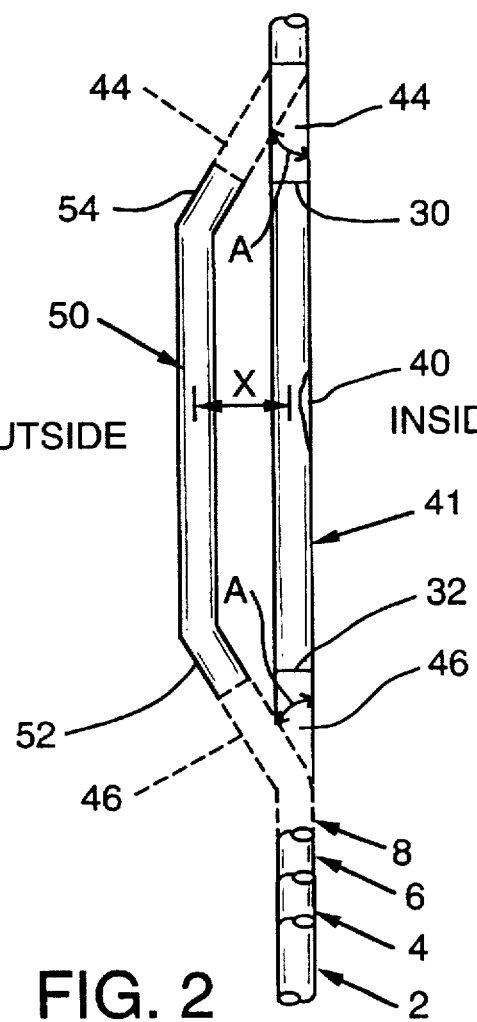
FIG. 2 is a partially schematic view showing a step in the method of repairing the defective tube.

In the present invention, a first step in repairing tube 8 will be to sever an axial section of tube 8 which may be considered as extending from upper limit 30 to lower limit 32. This separation may readily be accomplished by (a) drilling holes at these locations, (b) inserting a saw, and (c) separating section 30–32. In the preferred embodiment, the severed tube section 30–32 will remain in position. In the alternative, one may withdraw the axial section of the tube between reference numbers 30 and 32. Other means may be employed to effect severance at 30 and 32 and may, for example, employ wafer wheel grinder or make flame cuts by a torch. If desired, the severed portion between 30 and 32 may be retained in position. The tubes in this context will be metal. Referring to FIG. 2, a subsequent stage of the repair will be considered.

As shown in FIG. 2, a region of failure 40 is disposed between upper cut line 30 and lower cut line 32. This cut leaves upper free end portion 44 and lower free end portion 46. These portions are bent angularly outwardly in the same direction which is generally perpendicular to the plane of the array of tubes by an angle A measured from the longitudinal central axis of tube 8 and the longitudinal central axis of the dotted position of end portions 44, 46. Angle A is preferably about 20 to 60 degrees. Severed portion 41 may, as preferred, be retained in its position through securement to adjacent membranes or tubes, or it may be removed. An insert tube, sometimes known as "Dutchman" 50, is provided with a pair of bent portions 52, 54 which provide, respectively, axial tube portions which are coaxial with free end portions 44 and 46 as shown in dotted form. Effecting the repair, the bent end portions 52, 54 of the insert tube 50 will be circumferentially, continuously, sealingly secured to the dotted versions of 46, 44, respectively, in a manner to be discussed hereinafter. It will be appreciated that the height of the insert tube 50 may be any desired height. The axis of Dutchman is preferably offset from the axis of the tube section 41 by a distance X which is adequate to avoid interference with the 360° welding employed in securing the insert and may be preferably about 4 to 24 inches.

In effecting this sort of repair of the leak, it will be appreciated that forced down time of the system is shortened considerably when full tube replacement is effected until a scheduled shutdown occurs.

In the embodiment of FIG. 2, it will be appreciated that the water wall which is composed of tubes 2, 4, 6, 8, 10, 12, 14 may have any desired number of tubes and, in the form shown, has parallel tubes of generally straight configuration. The bending of the free end portions 44, 46 at angle A, serves to provide adequate space to facilitate joinder of the insert tube as by welding, for example.

Figure 3:
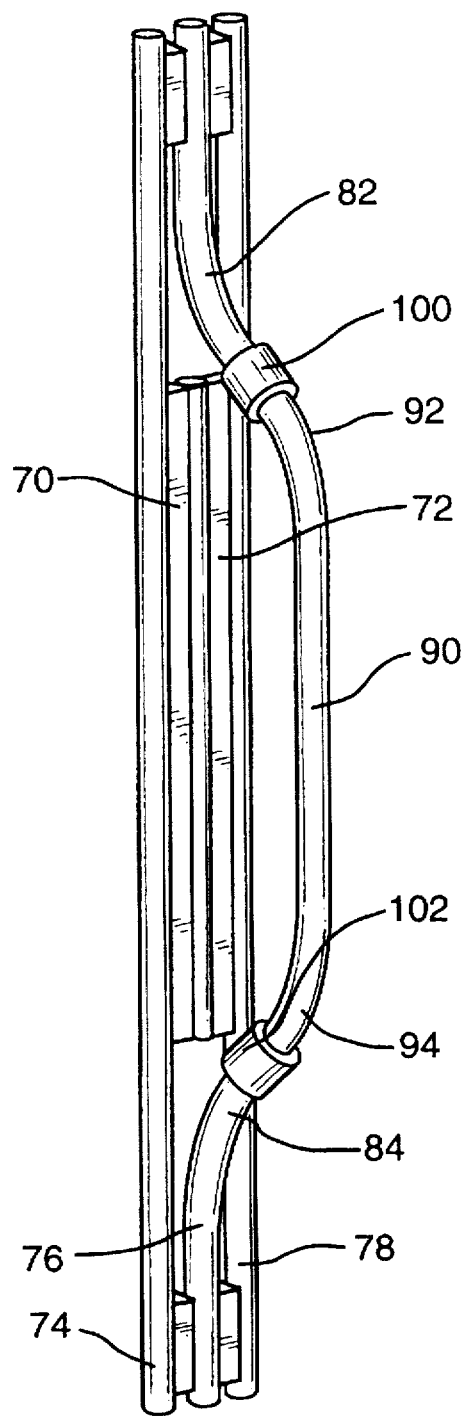
FIG. 3 is a perspective view of a plurality of generally parallel tubes with the middle tube having been repaired in accordance with the method of the invention by welding employing sockets.

Referring to FIG. 3, in this embodiment, rather than having the tubes in close adjacency to facilitate preservation of any pressure differential that is desired between the inside and outside of the water wall, a plurality of web or membrane portions, such as 70, 72, which are interposed respectively between tubes 74 and 76 and tubes 76 and 78, serve to provide a barrier. In effecting repair, it will be appreciated that the membrane-type web portions may be made of compatible metal as is well known to those skilled in the art or refractory or thermal insulation material, and may be secured to the tube by welding or, for example. In effecting the repair of tube 76, it will be appreciated that the damaged portion has been severed through axial separation and in this embodiment retention of the damaged portion in its original position, although it could be removed if desired. The upper free end portion 82 of the tube has been bent outwardly as has free end portion 84. The insert tube 90 has an angularly bent portion 92 and another angularly bent portion 94 which cooperates respectively with free end portions 82, 84 of the damaged tube. It will be appreciated that in this view, the steel membranes 70, 72 are discontinuous. The membrane sections have been removed by cutting, grinding or flame.

The bypass configuration results, in this embodiment, from a socket weld coupling 100 being welded to free end 82 and portion 92 of insert tube 90. Similarly, socket weld coupling 102 is welded to free end 84 of the tube and lower portion 94 of insert tube 90.

It will be appreciated that this bypass has been effected while leaving the central portion of tube 76 in its original position.

For use in the furnace portion of a boiler, the tubes which form the water wall may be made of any suitable metal, such as a compatible steel, for example, having a 1⅛ inch outside diameter and a 0.188 inch wall thickness as dictated by the ASME Boiler Code. The Dutchman may typically have a height measured from end to end along the longitudinal axis of the adjacent tubes of 18 inches to 20 feet depending upon the end use. It will be appreciated that the fluid carrying tubes may also be used in the vestibule and back pass. The tubes could also be employed to carry a wide variety of fluids, such as water or steam, for example.

Figure 4:
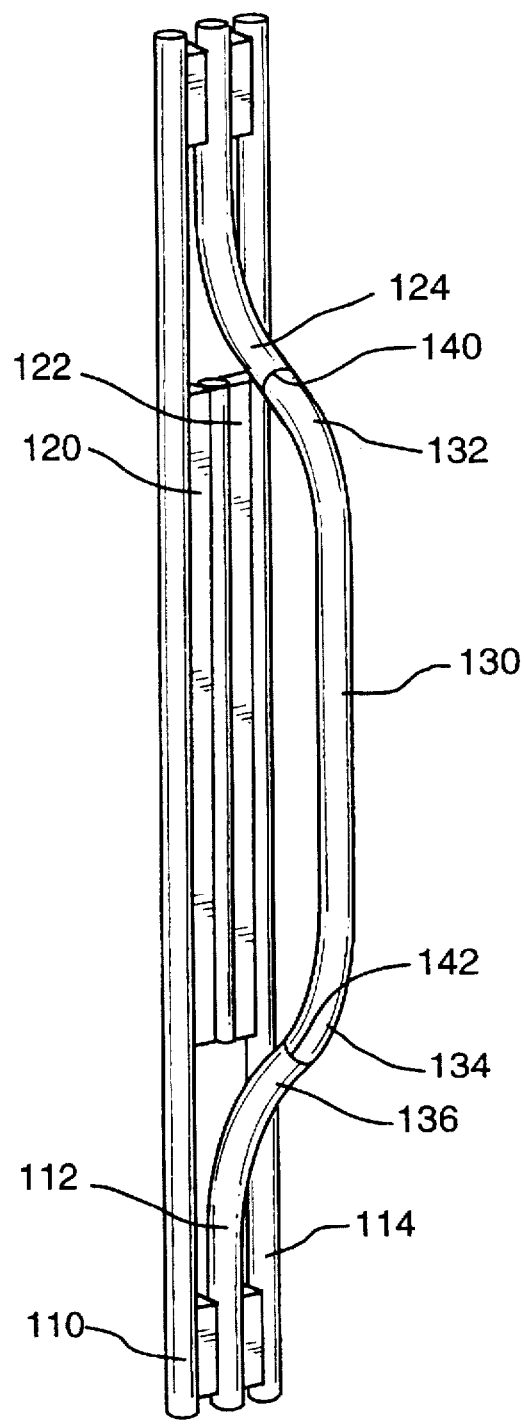
FIG. 4 is a view generally similar to FIG. 3, but showing butt welds.

Referring to FIG. 4, a plurality of tubes 110, 112, 114 are separated by and secured to steel membranes 120, 122 and have a pair of free ends 124, 126 which are secured to insert tube 130 adjacent bent ends 132, 134 by butt welds 140, 142. Portions of the membranes 120, 122, have been removed to facilitate access to tube 112 for repair.

Figure 5:
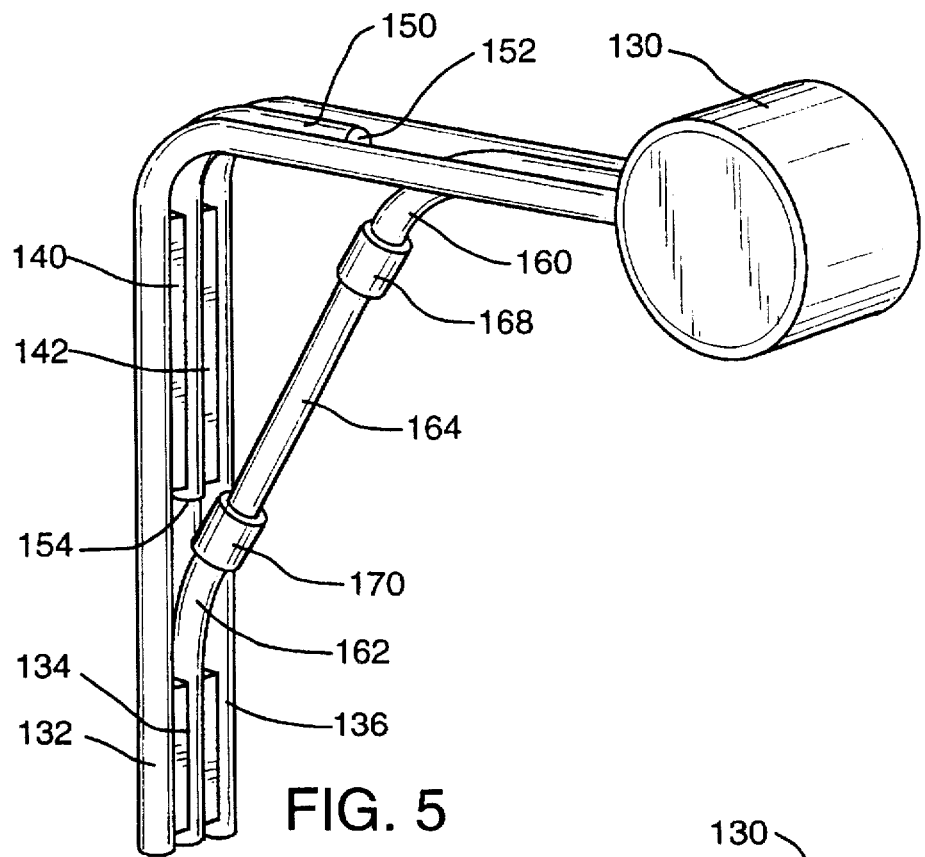
FIG. 5 shows a perspective view of an embodiment of the invention wherein a plurality of tubes has a right angled bend therein with the repair being effected by socket welds.
Figure 6:
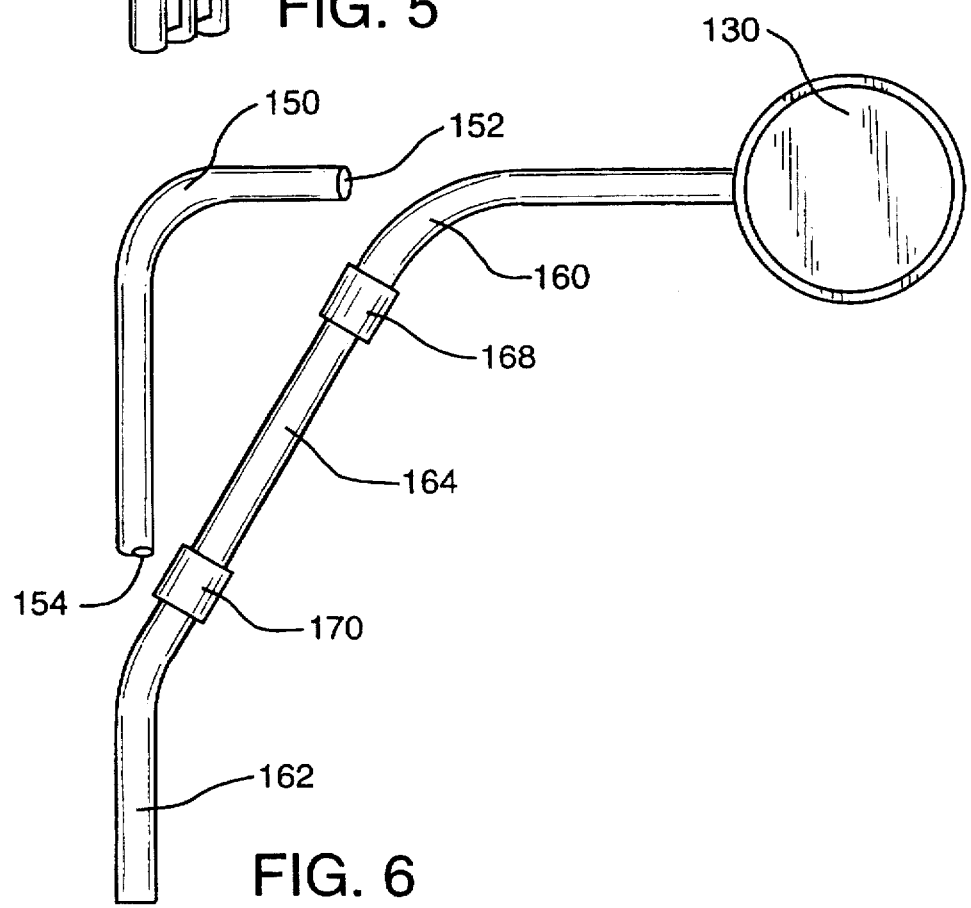
FIG. 6 is a cross-sectional view showing the defective tube residual portion and repair of FIG. 6.

Referring to FIGS. 5 and 6, there is shown a construction wherein a header 130 communicates with a plurality of tubes 132, 134, 136 which are separated by steel membranes 140, 142. The defective tube portion 150 has been cut at lines 152 and 154 with the free end portions 160, 162 being bent. An angularly disposed insert tube 164 is secured respectively to free ends 160, 162 by welding socket weld couplers 168, 170 to the tube ends 160, 162 and insert tube 164. The header 130 may carry any desired fluid depending upon the nature of the installation.

Figure 7:
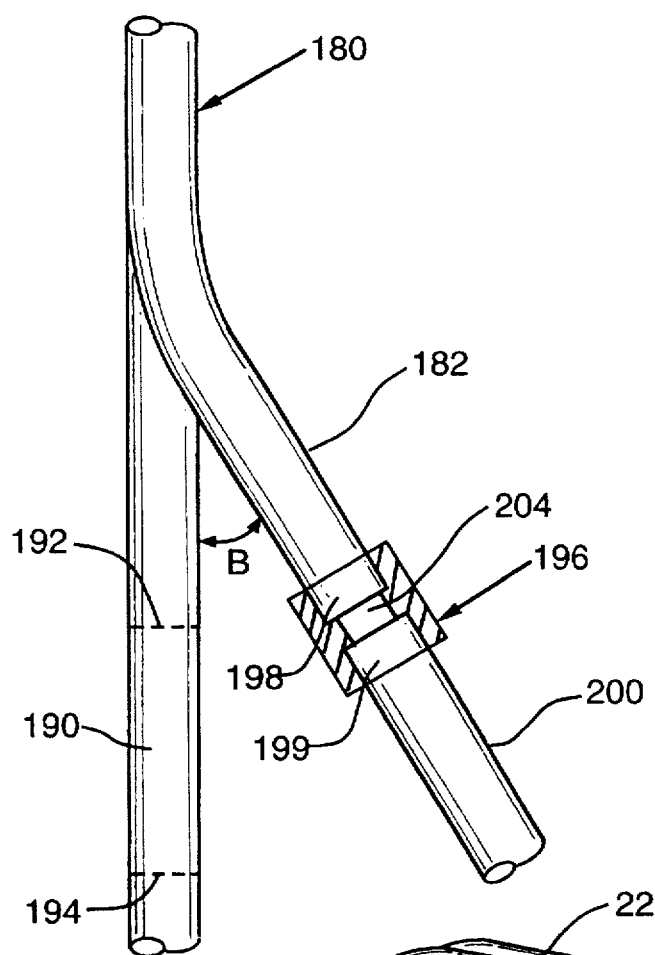
FIG. 7 is an elevational view showing a socket weld coupling secured to the bent tube end and the insert tube.

Referring to FIG. 7, there is shown a tube 180 having a bent free end 182 which forms a lesser included angle B with the original tube position, which preferably may be about 20 to 60 degrees. The damaged portion 190 of the tube is positioned between transverse line 192 and transverse line 194 and after severance of the tube along lines 192, 194, the damaged portion 190 may either be left in place or removed. In this embodiment, a socket weld coupling 196 receives end portions 198, 199, respectively, of free ends 182, 200. It is noted that the diameter 204 of the passageway is restricted in the axial center as compared with the diameter adjacent sections of coupling 196. This facilitates automatic termination of introduction of the tube ends 198, 199 into the coupling 196.

If desired and if consistent with sound engineering practice for a particular installation, the preferred use of a socket weld coupling may be substituted for by a butt weld or a threaded coupling wherein the coupling will have internal threads which are threadedly secured to external threads on the two pipe sections 182, 200 or may be a compression fitting. Compression fitting and threaded couplings are generally more suitable for heat exchangers, such as air conditioning units and chiller packages, coolers for air compressors, and oil coolers, for example, where high temperatures and pressures are not generally encountered.

Figure 8:
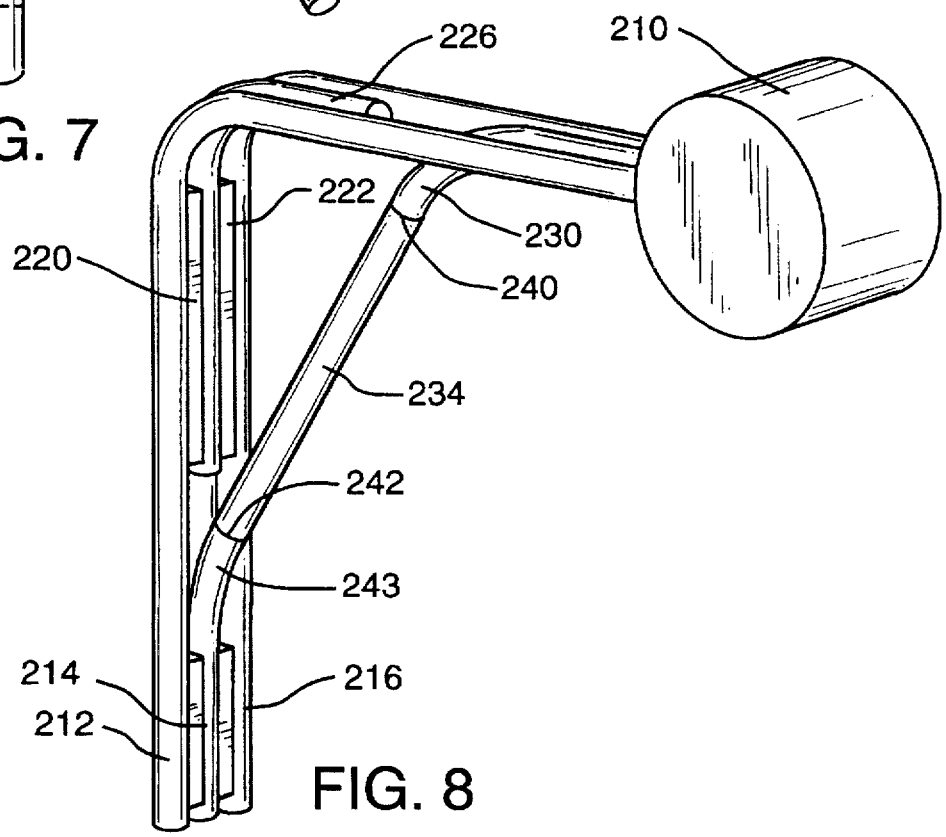
FIG. 8 is a view similar to FIG. 6, but showing a butt weld rather than a socket weld.

Referring to FIG. 8, there is shown a header 210 having a plurality of associated pipes 212, 214, 216 with their interposed steel membranes 220, 222 and a defective portion 226. The free end portions 230, 232 are secured to insert pipe or Dutchman 234 by butt welds 240, 242.

It will be appreciated that while the prime focus of the present disclosure has centered around use of arrays of relatively closely positioned metal tubes, with or without interposed metal membranes and particularly on such systems employed in fossil fuel steam generating boilers, the invention is not so limited. It may be used for a wide variety of heat exchangers.

It will be appreciated, therefore, that the present invention has provided a method for effectively repairing relatively inaccessible defects in a tube arranged in a plurality of tubes in such a manner as to shorten undesired, unscheduled shutdowns while preserving safety to repairman by facilitating repair from the cool side of the wall. It is a further object of the present invention to provide such a method which may be employed efficiently and economically with or without removal of the defective portion.

Whereas particular embodiments of the invention have been described herein for purposes of illustration, it will be evident to those skilled in the art that numerous variations of the details may be made without departing from the invention as defined in the appended claims.

We claim:

1. A method of repairing a defective portion in one of a plurality of generally parallel elongated tubes comprising
severing an axial portion of said tube which contains the defective portion from the remainder of said tube,
bending the free end portions of the tube disposed adjacent to where said axial portion was severed, and
securing an insert tube to said free end portions to reestablish a passage for free flow within said repaired tube.

2. The method of repairing of claim 1 including employing said method to repair tubing which carries fluids at least one of elevated temperature and elevated pressure.

3. The method of repairing of claim 2 including employing said method to repair a tube in a boiler water wall.

4. The method of repairing of claim 3 including employing said method to repair said tube from the cold side thereof.

5. The method of repairing of claim 1 including effecting said bending of each said end portion about 20 to 60 degrees with respect to the longitudinal axis of said defect containing tube.

6. The method of repairing of claim 5 including employing said method on metal tubes, and
securing said insert tube to said free end portions by welding.

7. The method of repairing of claim 6 including effecting said weld by employing socket joints, and
securing said socket joints to each end of said insert tube and to the bent free ends of said defective tube.

8. The method of repairing of claim 6 including effecting said welds by butt welding.

9. The method of repairing of claim 5 including securing said insert tube by a compression fitting.

10. The method of repairing of claim 1 including effecting said repair on a tube having a substantially straight longitudinal axis.

11. The method of repairing of claim 1 including effecting said repair on a tube having an axial bend.

12. The method of repairing of claim 5 including securing said insert tube by threaded connections to said free end portions.

13. The method of repairing of claim 1 including providing web means between said tubes to provide a barrier therebetween.

14. The method of repairing of claim 1 including employing said method to repair a metal tube, and
employing a metal insert tube in effecting said repair.

15. The method of repairing claim 1 including after severing said axial portion removing it prior to securing said insert tube to said free end portions.

16. The method of repairing of claim 1 including retaining said axial portion generally in its original position after effecting said severing.

17. The method of repairing of claim 1 including securing said insert tube with its longitudinal axis spaced about 4 to 24 inches from the longitudinal axis of said tube having said defective portion.

18. The method of repairing of claim 5 including effecting said bending of said end portions in substantially the same direction.

19. The method of claim 1 including sealingly securing said insert tube to said free end portions continuously about the circumference of said insert tube.

* * * * *